March 7, 1950   R. W. JONES   2,499,867
BEET TOPPING APPARATUS FOR BEET HARVESTERS
Filed Aug. 31, 1946   4 Sheets-Sheet 1
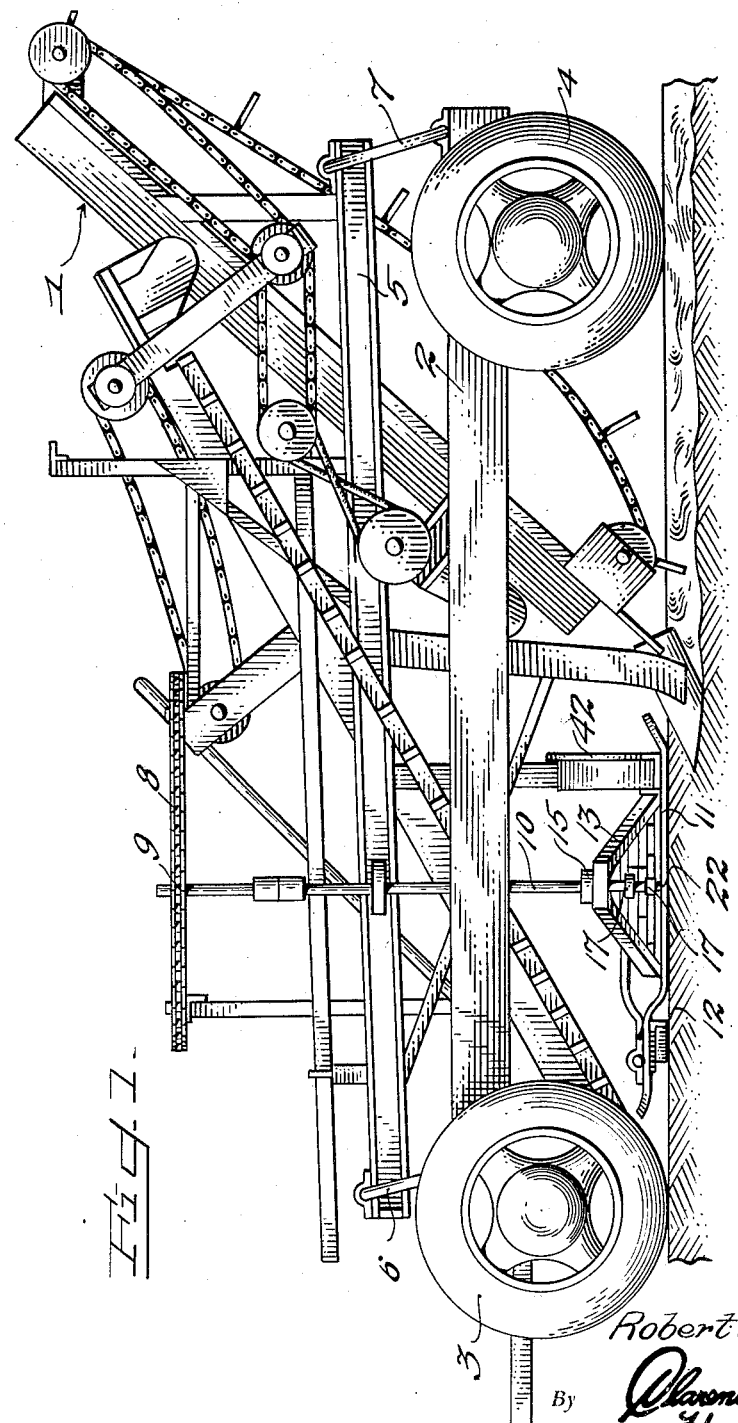
Inventor
Robert William Jones.
By Clarence A. O'Brien
and Harvey B. Jacobson
Attorneys March 7, 1950  R. W. JONES  2,499,867
BEET TOPPING APPARATUS FOR BEET HARVESTERS
Filed Aug. 31, 1946  4 Sheets-Sheet 2
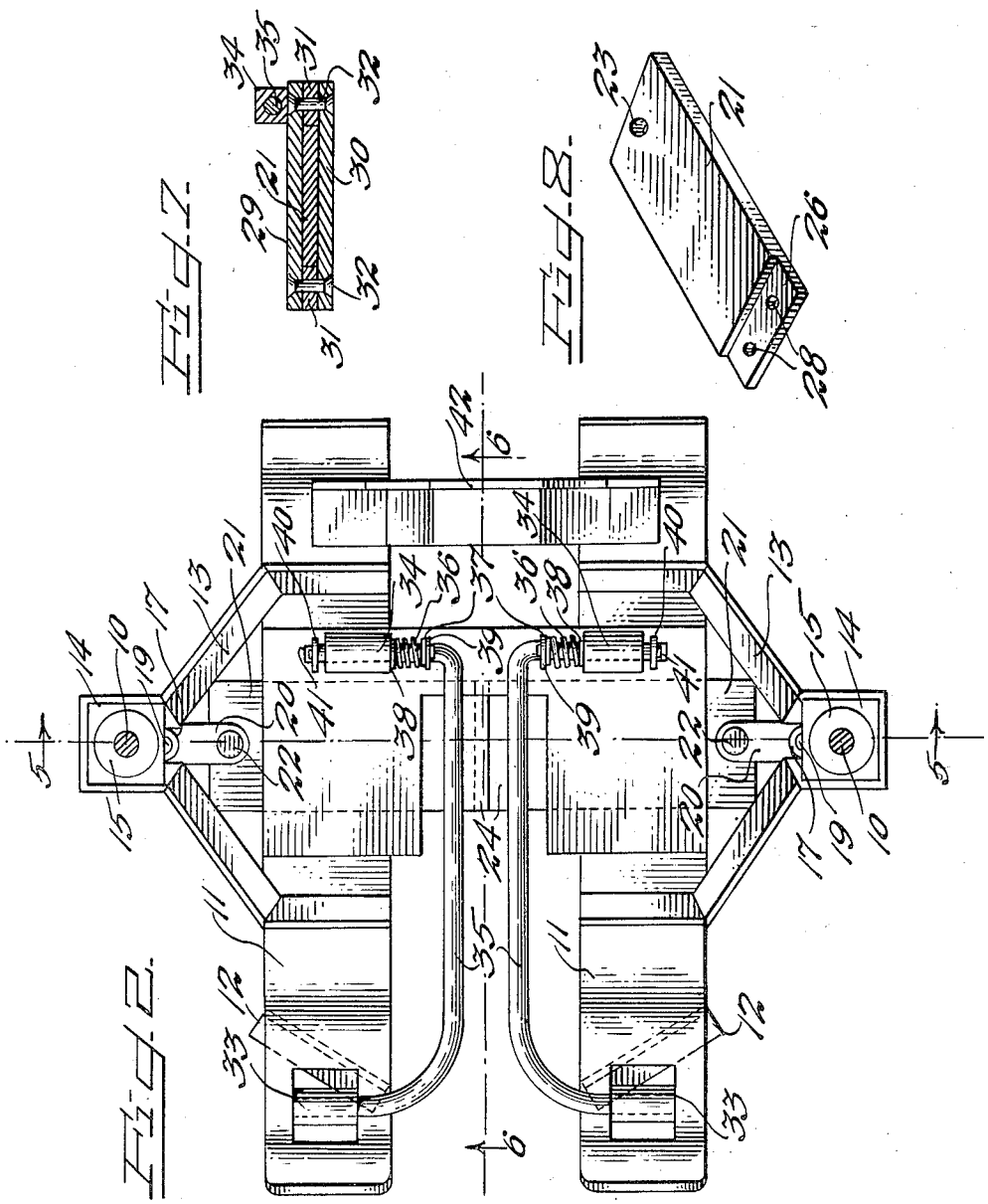
Inventor
Robert William Jones.
By Clarence A. O'Brien
and Harvey B. Jacobson
Attorneys March 7, 1950  R. W. JONES  2,499,867
BEET TOPPING APPARATUS FOR BEET HARVESTERS
Filed Aug. 31, 1946  4 Sheets-Sheet 3
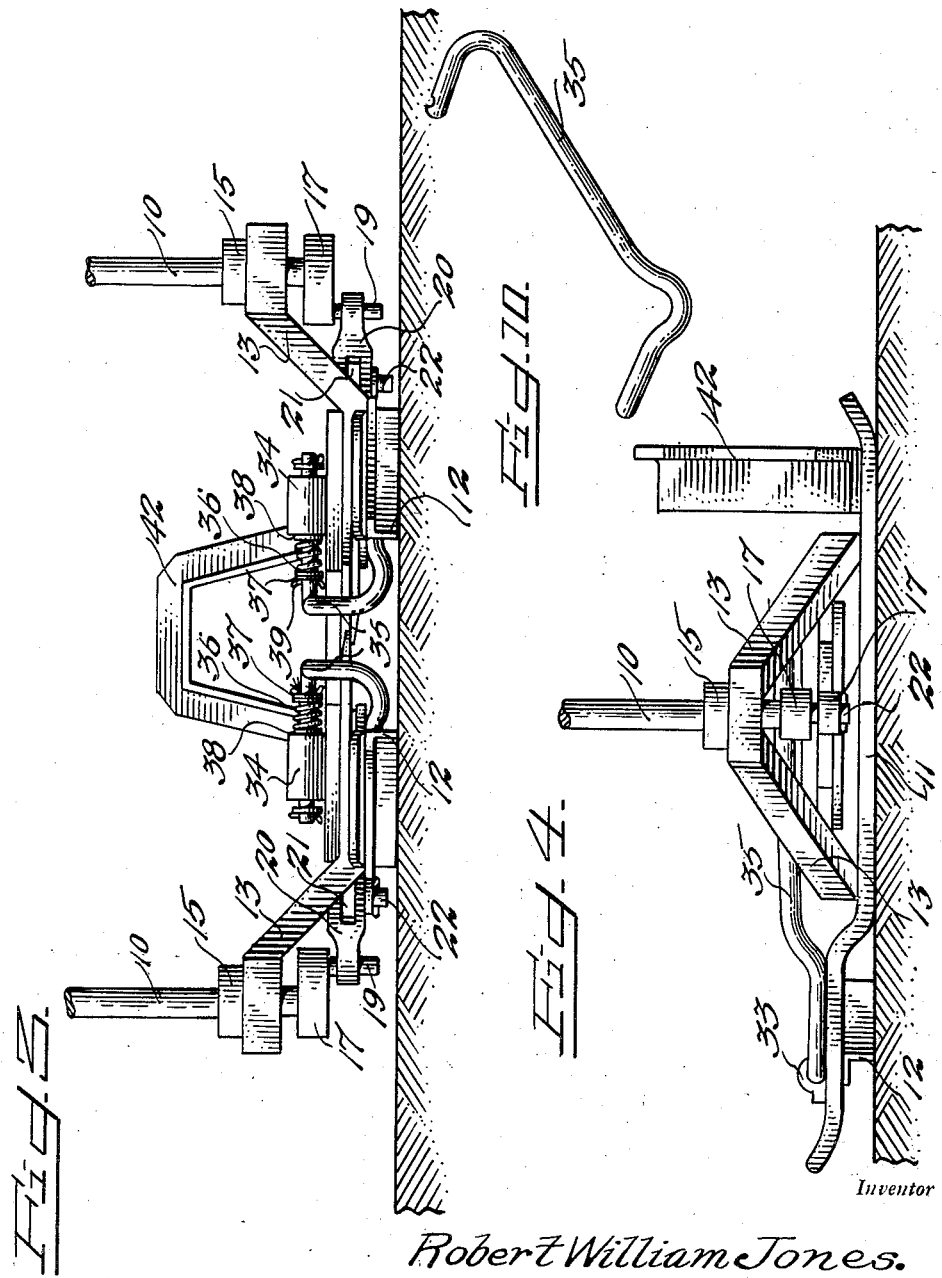
Inventor
Robert William Jones.
By Clarence A. O'Brien
and Harvey B. Jacobson
Attorneys March 7, 1950 R. W. JONES 2,499,867
BEET TOPPING APPARATUS FOR BEET HARVESTERS
Filed Aug. 31, 1946 4 Sheets-Sheet 4
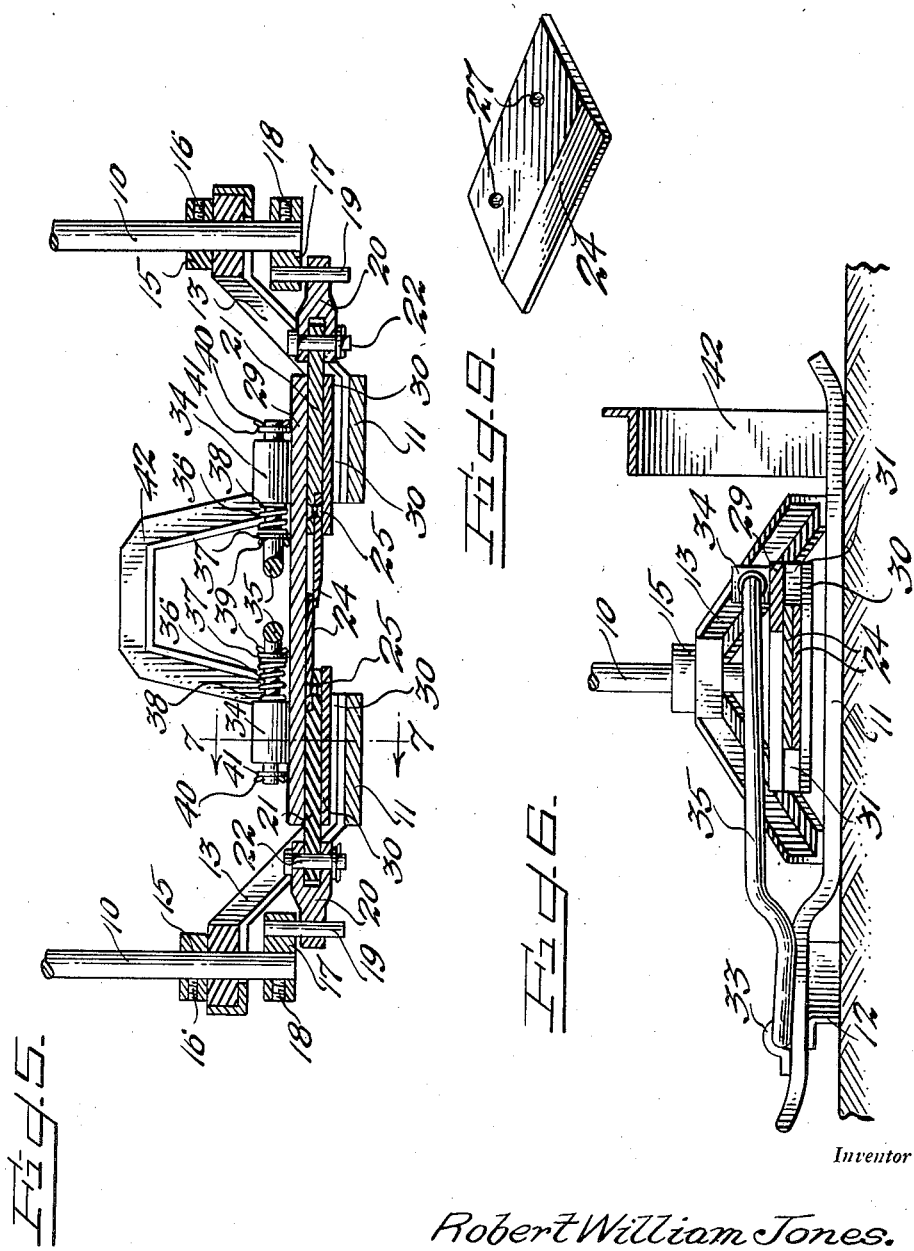
Inventor
Robert William Jones.
By Clarence A. O'Brien
and Harvey B. Jacobson
Attorneys Patented Mar. 7, 1950

2,499,867

UNITED STATES PATENT OFFICE 2,499,867

BEET TOPPING APPARATUS FOR BEET HARVESTERS

Robert William Jones, Flint, Mich.

Application August 31, 1946, Serial No. 694,358

11 Claims. (Cl. 56—121.4)

This invention relates to improvements in beet harvesters, and more especially to an improved beet topping apparatus used in conjunction therewith.

An object of the invention is to provide an improved beet topping apparatus for beet harvesters which will automatically adjust itself to the proper height for removing the beet tops.

Another object of the invention is to provide an improved beet topping apparatus including resiliently adjustable guide rods adapted to ride on the crowns of the beets to adjust the topping knives to the proper height.

A further object of the invention is to provide an improved beet topping apparatus for beet harvesters including runners or shoes slidable along the ground on each side of the beet, together with dirt removing bars at the forward ends thereof for removing excess dirt away from each side of the beet, and guide rods slidable on the crowns of the beet for automatically adjusting the height of the topping knives which are suitably driven for reciprocating movement by driving rods and interconnected pitman operated slides on which said knives or blades are riveted.

Another object of the invention is to provide an improved beet topping apparatus for beet harvesters which will be highly efficient in operation, and relatively inexpensive to manufacture and produce.

Other objects will appear as the description proceeds.

In the accompanying drawings which form a part of this application,

Figure 1 is a side elevation of a beet harvester with the improved beet topping mechanism incorporated therewith;

Figure 2 is a plan view of the beet topping mechanism;

Figure 3 is a front elevation of the beet topping mechanism;

Figure 4 is a side elevation of the beet topping mechanism;

Figure 5 is a sectional view taken on the line 5—5 of Figure 2;

Figure 6 is a sectional view taken on the line 6—6 of Figure 2;

Figure 7 is a sectional view taken on the line 7—7 of Figure 5;

Figure 8 is a perspective view of one of the topping blade supporting slides;

Figure 9 is a perspective view of one of the topping blades, and

Figure 10 is a perspective view of one of the guide rods.

Like characters of reference are used throughout the following specification and the accompanying drawings to designate corresponding parts.

In carrying out the invention, there is illustrated a beet harvester generally designated by the reference numeral 1 having a main frame 2 supported upon the front and rear wheels 3 and 4 respectively, and supporting an upper frame 5 for vertical adjustment upon the connecting links 6 and 7. A suitable motor (not shown) will be provided for operating the various mechanisms on the harvester 1, and a chain 8 will drive the sprockets 9 on the upper ends of the vertical driving rods 10 upon which the improved beet topping mechanism is supported.

The beet topping mechanism which forms the subject matter of the instant invention comprises a pair of spaced longitudinally extending shoes or runners 11 which are bent upwardly adjacent their forward ends to support the angled dirt removing bars 12 which are used to scrape the excess dirt from the opposite sides of the beets as the harvester 1 is pulled along the beet rows.

The laterally extending supporting frames 13 are secured to the said runners 11 and extend outwardly therefrom to support the driving rod bearings 14 through which the vertical driving rods 10 extend. Locking collars 15 are secured to the driving rods 10 by means of the set screws 16 to support and adjust the topper assembly at the desired height.

The pitmans 17 are secured on the lower ends of the driving rods 10 by means of the set screws 18 and support the depending pitman pins 19 extending through the outer ends of the connecting links 20, which are forked at their inner ends to connect with the reciprocating slides 21, by means of connecting link pins 22 extending through the yoke portions of said connecting links 20 and through the apertures 23 in the outer ends of the slides 21. Inwardly extending topping knife blades 24 are secured by the rivets 25 upon the seat 26 on the slides 21 and extend through the apertures 27 in said blades and the apertures 28 in said slides.

The top slide plate 29 of substantially U-shape extends transversely over the reciprocating slides 21, while the slide wear plates 30 are disposed immediately below said reciprocating slides 21. The slide retaining spacers 31 are disposed in front of and behind the reciprocating slides 21 between the top slide plates 29 and the slide wear plates 30, and are held in fixed assembled position by means of the rivets 32 extending through the several parts.

The front guide rod retainers 33 are secured transversely on the upper surfaces of the forward end of the shoes or runners 11, while the rear guide rod retainer blocks 34 are secured to the upper surfaces at the rear of said shoes or runners 11, and support the outer ends of the U-shaped guide rods 35 whose middle portions extend in parallel relation to ride on the crown of the beets as the beet harvester is pulled along the beet rows, said guide rods automatically adjusting the topper knife blades 24 to the proper height.

Coil tensioning springs 36 will be disposed about the inner rear ends of the guide rods 35 between the washers 37 and 38, which will be held in place by means of the pins or cotter keys 39. Cotter keys 40 and washers 41 will be placed respectively through and about the extreme rear end portions of the guide rods 35 exteriorly of the rear guide rod retainer blocks 34. It will therefore be seen that the parallel guide rods 35 will permit the topping assembly to adjust itself to the proper height for removing the beet tops.

The rear height adjusting yoke 42 is secured to the shoes or runners 11 and is adjusted with them to maintain the proper height at the rear of the shoes.

In operation, the driving rods 10 are rotated by means of the sprockets 9 secured to their upper ends, said sprockets being connected by the chains 8 and driven by a suitable motor (not shown). Rotation of the driving rods 10 will rotates the pitmans 18, which will operate through the connecting links 20 to reciprocate the reciprocating slides 21, and the topping knife blades 24 which are attached thereto. The locking collars 15 and the pitmans 17 serving to limit the downward and upward adjustment of the said driving rods 10 to permit the topping assembly to operate at the proper heights.

From the foregoing description, it will be apparent that there has been provided an improved form and construction of beet topping apparatus for beet harvesters which will be highly efficient in operation.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In a beet harvester including a beet topping apparatus, a pair of spaced longitudinally extending ground engaging shoes, a supporting frame therefor, rotatable driving rods mounted vertically through said frames, means for rotating said rods, a pair of overlying, complementary reciprocating beet topping cutter blades connected with and operable by said driving rods, said shoes having upwardly flared forward end portions, and means carried by said shoes adjacent the forward end portions thereof for scraping excess dirt from the opposite sides of beets.

2. In a beet harvester including a beet topping apparatus, a pair of spaced longitudinally extending ground engaging shoes, parallel adjustable guide rods supported on said shoes, a supporting frame for said shoes, rotatable driving rods mounted vertically through said frame, means for rotating said rods, a pair of overlying, complementary reciprocating beet topping cutter blades connected with and operable by said driving rods, said shoes having upwardly flared end portions, and scraper members carried by the shoes adjacent the flared end portions thereof for scraping excess dirt from opposite sides of beets.

3. In a beet harvester including a beet topping apparatus, a pair of spaced longitudinally extending ground engaging shoes, parallel adjustable substantially U-shaped guide rods supported thereby, resilient tensioning means for said guide rods, said guide rods including web portions adapted to ride on the crown of beets, supporting frames on said shoes, rotatable driving rods mounted vertically through said frames, means for rotating said rods, a pair of overlying, complementary reciprocating beet topping cutter blades connected with and operable by said driving rods, said shoes having upwardly flared forward end portions, and angle members fixed to the under side of said shoes adjacent the forward end portions thereof for scraping excess dirt from opposite sides of beets.

4. In a beet harvester including a beet topping apparatus, a pair of spaced longitudinally extending ground engaging shoes, parallel adjustable guide rods supported thereby, resilient tensioning means normally urging said guide rods toward each other, supporting frame secured to said shoes, rotatable driving rods mounted vertically through said frames, means for rotating said rods, a pair of longitudinally aligned reciprocating slides mounted transversely of said shoes, knife blades secured thereto, pitmans on the lower ends of said driving rods, and connection between said slides and pitmans for reciprocating said slides and attached knife blades.

5. The subject matter as claimed in claim 4, and dirt removing bars mounted at an angle under the forward ends of said ground engaging shoes.

6. The subject matter as claimed in claim 4, dirt removing bars mounted at an angle under the forward ends of said ground engaging shoes, and means on said driving rods for limiting the vertical adjustment thereof.

7. The subject matter as claimed in claim 4, and slide top and wear plates disposed respectively above and below said reciprocating slide plates.

8. The subject matter as claimed in claim 4, slide top and wear plates disposed respectively above and below said reciprocating slide plates, and slide retaining spacers between said slide top plate and said slide wear plate.

9. Means for supporting the reciprocating cutter blades of a beet topping mechanism comprising, a pair of spaced parallel runners having upwardly flared forward end portions, means carried by the under surface of each of said runners adjacent the forward ends thereof for scraping excess dirt from the opposite sides of beets, a pair of substantially U-shaped guide rods having web portions adapted to ride on the crown of beets, said guide rods being movable relative to each other, means carried by said runners slidably supporting said guide rods, means normally urging said guide rods toward each other, supporting frames carried by said runners, bearings supported by said frames, vertically disposed driven shafts journaled in said bearings, and reciprocating cutter supporting links actuated by said driven shaft.

10. The combination of claim 9 wherein said means for scraping excess dirt from the opposite sides of beets includes an angle iron member fixed to each of said runners and disposed at an inclined angle to the longitudinal axes of said runners.

11. The combination of claim 9 wherein said means slidably supporting said guide rods includes forward and rear retainer sleeves carried by each of said runners slidably receiving the ends of said guide rods.

ROBERT WILLIAM JONES.

REFERENCES CITED

The following references are of record in the file of this patent:

UNITED STATES PATENTS

| Number | Name | Date |
|---|---|---|
| 157,594 | Elmenhorst | Dec. 8, 1874 |
| 1,182,899 | Enders | May 16, 1916 |
| 1,220,977 | Goulet | Mar. 27, 1917 |
| 1,480,272 | Krotz | Jan. 8, 1924 |
| 1,886,843 | Sherman | Nov. 8, 1932 |
| 2,183,779 | Schuler | Dec. 19, 1939 |
| 2,314,681 | Beatty | Mar. 23, 1943 |